United States Patent [19]

Carter et al.

[11] 4,274,731
[45] Jun. 23, 1981

[54] TOTAL IMMERSION CONTINUOUS LOOP APPARATUS AND METHOD

[75] Inventors: William D. Carter, Rancho Palos Verdes; Martin S. Mueller, Torrance, both of Calif.

[73] Assignee: Carter Equipment Co., Inc., Lawndale, Calif.

[21] Appl. No.: 85,910

[22] Filed: Oct. 18, 1979

[51] Int. Cl.³ .............................................. G03B 27/52
[52] U.S. Cl. ....................................... 355/30; 352/56; 355/91
[58] Field of Search .................... 355/91, 30, 50, 102, 355/103, 75; 352/56, 126, 130, 2, 104; 274/47; 15/100, 306 A

[56] References Cited

U.S. PATENT DOCUMENTS

| 3,640,293 | 2/1972 | Freedman | 352/56 X |
| 3,664,738 | 5/1972 | Cameron | 355/91 X |
| 4,105,329 | 8/1978 | Carter et al. | 355/91 |

Primary Examiner—Richard A. Wintercorn
Attorney, Agent, or Firm—Gene W. Arant; Thomas I. Rozsa

[57] ABSTRACT

A closed container or tank containing a body of liquid within which is totally immersed an endless loop of flexible web material such as motion picture film, with said flexible web material wound in a multiple loop within the container, and provisions for an extended loop portion of said flexible web material to enter and exit the tank at the same rate of speed. The extended loop portion of said flexible web is designed to run through a second apparatus such as a motion picture printing machine in a continuous and uninterrupted path.

6 Claims, 5 Drawing Figures

TOTAL IMMERSION CONTINUOUS LOOP APPARATUS AND METHOD

BACKGROUND OF THE INVENTION

The present invention relates to the use of a removable film storage apparatus containing an endless loop of flexible web material such as the master picture negative for use in conjunction with a film printing machine that prints the master picture negative and/or the master sound track onto a length of raw stock or unexposed film. The scope of the present invention incorporates both the apparatus for and the method of using said storage apparatus containing an endless loop of film while immersed in a tank containing a continuously filtered liquid, for use with a film printing machine that exposes film either in air or in a liquid medium.

For the purposes of high volume, high speed duplication of motion picture film, one highly inefficient system is presently employed by the industry. The master negative and the master sound track are housed in large cabinets or structures and are threaded over numerous rollers in these cabinets which support and transport the long lengths of photographic film while it is being fed in a loop both to and from a conventional motion picture printing machine in which the film is threaded in a conventional fashion. These devices may be driven by self-contained or external rotational means such as electric motors or may be of a non-driven configuration utilizing conventional low friction bearings in the numerous rollers and/or their supporting shafts. The present system contains numerous disadvantages. The cabinets are volumetrically inefficient insofar as space is concerned. The on-loading and off-loading of the master picture negative and the master sound track is a time-consuming and hazardous operation since the film is subjected to possible tears and abrasions due to the large number of rollers involved. The presently used system operates in an air medium which has the problem of static electricity being generated by the strips of film which in turn attracts particulate matter thus causing wear and tear on the film in spite of air-vacuum squeegees and static eliminating devices commonly used.

Due to the voluminous construction of the apparatus and the large number of rollers over which the film must pass, the master picture negative and the master sound track is subjected to enormous wear and tear and therefore the useful life of these master negatives is significantly limited. The enormous size of the present system also presents a large maintenance problem and large amounts of time must be spent on maintaining the cleanliness of the cabinet and the rollers.

A second system also in use of the purposes of high volume, high speed duplication of motion picture film involves the use of running a loop of master picture negative and a loop of master sound track through a motion picture printing machine while the raw stock or unexposed negative is passed through the machine from above to come in contact with the masters at the point of printing. Referred to in the trade as a panel printing machine, it is inefficient for two reasons. First, the operator must stop the film after one full roll of print negative has been exposed in order to cut the exposed print film and thread a new roll of raw stock (unexposed film) so that the machine can be run in the reverse direction to expose the next roll of exposed print film. This involves a considerable loss of time. It also involves wasting unexposed film. For example, if the unexposed film roll is 1000 feet and the masters are 980 feet, the 20 additional feet of film on the unexposed roll is not used and is therefore wasted.

Both of the systems presently in use have significant disadvantages. The present invention solves many of the problems occurring in the existing systems and provides a significant improvement in high volume, high speed duplication of motion picture film. While the description in the specification relates to the use of motion picture film, the present invention is broad enough in scope so as to cover any flexible web-type material such as microfilm, paper, vinyl, and any other type of material which uses the apparatus and method described in this specification. It is therefore, a primary object of the present invention to provide a means for greatly reducing the physical volume required to contain a given amount of film which is generally large.

A further object of the present invention is to provide a means for supplying the master picture negative and the master sound track to a motion picture printing machine through an apparatus which significantly reduces the amount of rollers over which the film must pass, thereby providing far less wear and tear on the film and significantly increasing its useful life.

Another object of the present invention is to provide an apparatus and method which enables the master picture negative and the master sound track to be immersed in a body of liquid while being maintained in storage and also while in use during the film printing process. By having the film immersed in a liquid, the problem of static electricity is eliminated and the film can be wound in much higher density without the concern of abrasion which would degrade the film and significantly limit its useful life.

A further object of the present invention is to provide an apparatus and method which enables the master picture negative and the master sound track to be continuously supplied to the motion picture printing machine over and over without the necessity of rewinding the master track after a run before it can be reused.

Another object of the present invention is to provide an apparatus for providing the master picture negative and the master sound track to the motion picture printing machine which is easily maintained and which does not have a large number of rollers and other physical apparatus which must be cleaned.

Yet a further object of the present invention is to provide an apparatus for and method of high speed high volume duplication of motion picture film which allows the unexposed print film to be continuously run through the motion picture printing machine by virtue of the fact that the master picture negative and the master sound track are simultaneously continuously running, thereby eliminating delay caused by the necessity of rethreading of the master negatives.

DRAWING SUMMARY

Referring particularly to the drawings for the purposes of illustration only and not limitation there is illustrated:

SUMMARY OF THE INVENTION

Figure 1:
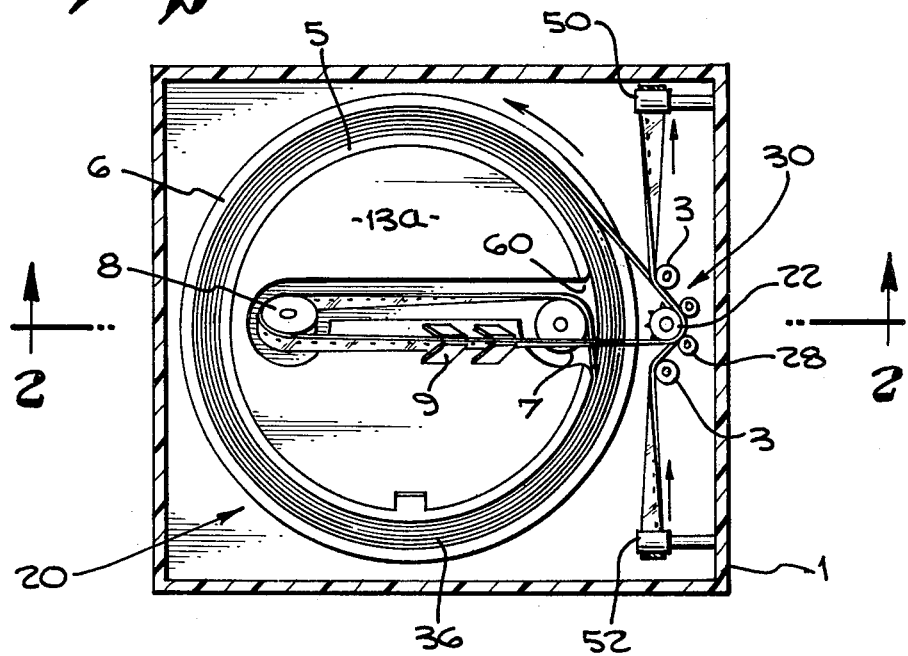
FIG. 1 is a top plan view of the total immersion continuous loop apparatus of the present invention.

The present invention provides an improved apparatus and an improved method of printing motion picture film when high volume production is desired.

The present invention involves a method of supplying a master picture negative (film negative) and/or a master sound track to a motion picture printing machine by arranging the masters in a continuous loop having a multi-loop portion or convolutions where the film is housed and an extended loop portion which runs through the motion picture printing machine. The method further involves the use of a liquid bath in which the multi-loop portion of the master film rests both during storage and operation, said liquid being compatible in terms of index of refraction and other properties with both the film and the liquid used in "wet" motion picture printing machines. The method further involves driving the master film in a continuous path which runs through the motion picture printing machine and back through the multi-loop portion of the master film so that unexposed film may be continuously printed in an efficient manner. The method is adaptable to use with both motion picture printing machines that are run in air (called "dry" printing) or to motion picture printing machines which have the printing mechanism immersed in a liquid medium (called "wet" printing) as illustrated in the Carter et al U.S. Pat. No. 4,105,329.

The present invention also involves the apparatus for producing the above method. One feature of the present invention involves the use of an endless loop of flexible web material such as motion picture film which is continuously circulated through a motion picture printing machine. The master picture negative or master sound track is wound around a film support drum which creates a closely wound multi-loop of film from which an extended portion of the loop is run through the motion picture printing machine to be used in exposing the unexposed film.

An additional feature of the present invention is to have the multi-loop portion of the master film immersed in a continuously filtered liquid medium whose physical properties are compatible with the film and with the liquid in a "wet" motion picture printing machine. The liquid mediums allow the master film to be closely wound in a multi-loop without fear of static electricity or abrasion from particles which prior to this invention would more severely limit the useful life of the master film.

Another feature of the present invention is to have the multi-loop portion of the master film rest on a driven film support flange which moves the film continuously through the multi-loop portion.

Another feature of the present invention is to have an angled roller within the central hub of the multi-loop which elevates the exiting portion of the film over the multi-loop portion so that the exiting portion of the film will clear the thickness of the film wound in the loop prior to exiting the multi-loop area.

Another feature of the present invention is to have two sprockets driven by a central spindle both being driven at the same speed, with one sprocket simultaneously driving and guiding the film entering the multi-loop portion and one sprocket simultaneously driving and guiding the film exiting the multi-loop portion so that the film entering and exiting the motion picture printing machine is moving at the same speed.

Yet another feature of the present invention is to have the multi-loop portion of the film housed in a separate tank which is sealed by a cover to prevent vapors generated by the liquid from escaping. Multiple tanks with different master films can be placed side by side or stacked one on top of the other so that they may be served with one vapor exhaust system and one liquid filtration system serving all of the tanks.

Further novel features and other objects of this invention will become apparent from the following detailed description, discussion and the appended claims taken in conjunction with the drawings.

DETAILED DESCRIPTION OF THE PREFERRED EMBODIMENT

With reference to the drawings of the invention in detail and more particularly to FIG. 1, the present invention is shown from a top plan view with the top cover 18 removed. The present invention is housed in a tank 1. Inside the tank is a continuous film storage apparatus which comprises a fixed center hub portion 13, a removable film support drum 5 with a gap 60 in its surface, and a driven film support flange 6 which has multiple support rollers 17. Located within the center of the film storage apparatus 20 and within a cavity in said fixed center hub portion 13, is a stripper roller 7 and an angled guide roller 8. Wiper blades which remove liquid from the film are shown at 9, located above and beside said cavity.

Film enters and exits the invention through entrance roller 52 and exit roller 50 respectively which are a single subassembly. To one side of the film storage apparatus 20 is a sprocket assembly 30 which is shown in greater detail in FIG. 2. Said sprocket assembly comprises a central spindle 26 which supports an upper sprocket 22 and a lower sprocket 24. The sprocket assembly 30 is driven by a sprocket driving means shown as 14 in FIG. 2. This sprocket driving means 14 is located outside the tank 1. Around the periphery of the sprocket assembly 30 are guide rollers 3 and hold down rollers 28.

The film 36 which is wound around the film support drum 5 is supported by a flange 6. The flange is rotated and driven by a flange driving means 15 through a capstan type driving puck 16. The flange driving means is located outside of the tank 1.

The entire tank 1 is filled with a fluid 10 which is kept in constant circulation by a fluid circulating means 11 located outside of the tank 1 and connected to it through piping means shown at 40 and 42. Liquid vapors emanating from the circulating fluid are kept inside the tank 1 through vapor control cover 18. The vapors from the liquid are removed from the tank 1 through a vapor exhaust system 12 by means of piping shown at 44 which connects the vapor exhaust system 12 which is located outside the tank 1.

The present invention resides in the specific and improved use of a continuous film storage apparatus for the master picture negative and/or a continuous film storage apparatus for the master sound track so that said master picture negative and said master sound track can be used in a continuous and uninterrupted fashion during the process of printing the picture and the sound on a length of raw stock or unexposed film. The present invention also resides in the use of a liquid medium though which both film and sound masters pass in order to enable the quality of the films to be maintained and to significantly reduce the abrasion on the films during the process of the continuous printing of the raw stock of unexposed film.

Figure 4:
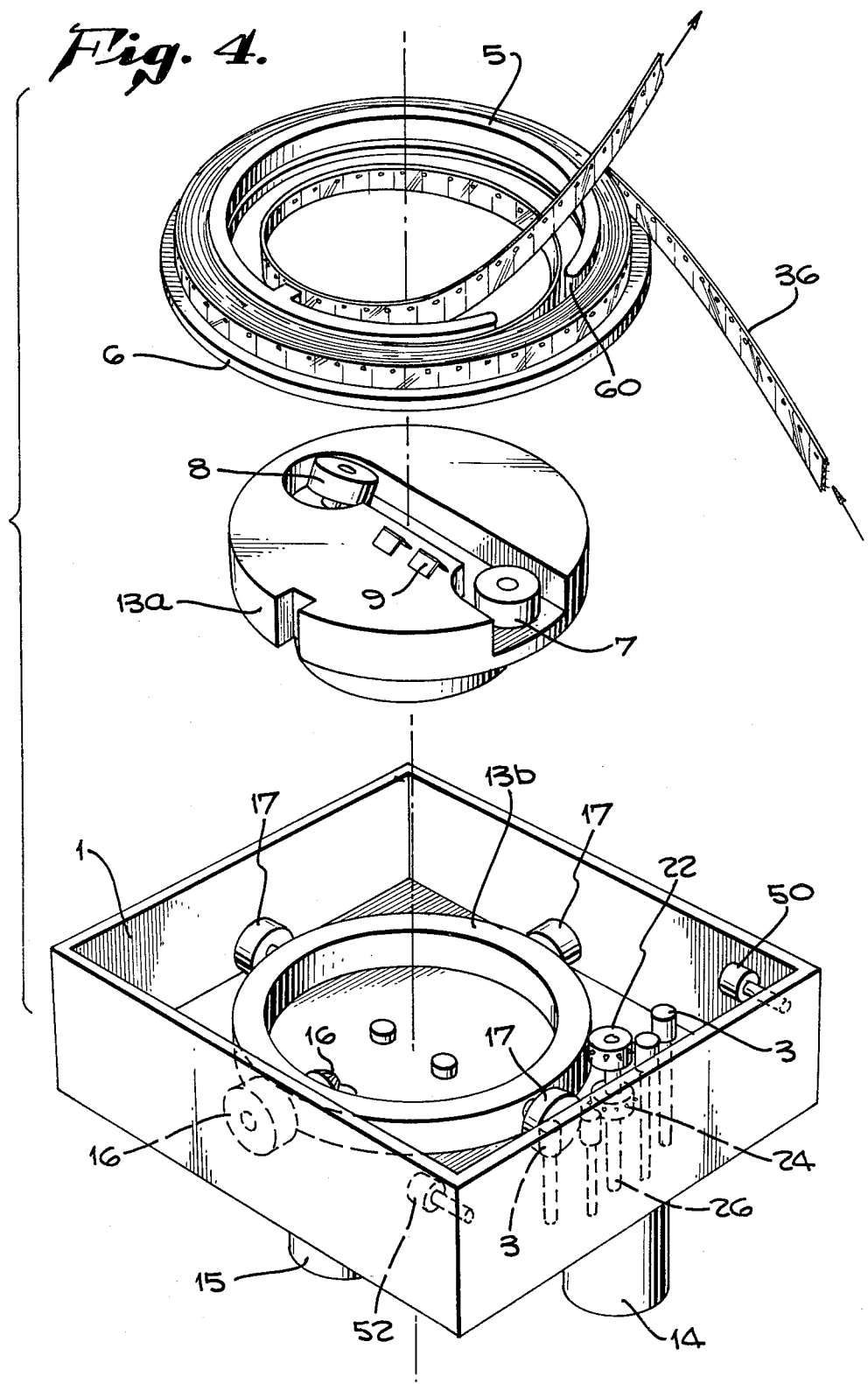
FIG. 4 is a perspective view of the present invention showing the film support drum, multi-loop portion of film and the driven film support flange removed from the tank.

FIG. 4 shows a particular form of the apparatus in which the hub 13 consists of a removable center part 13a and a fixed outer part 13b which must remain in tank 1.

OPERATION

Figure 3:
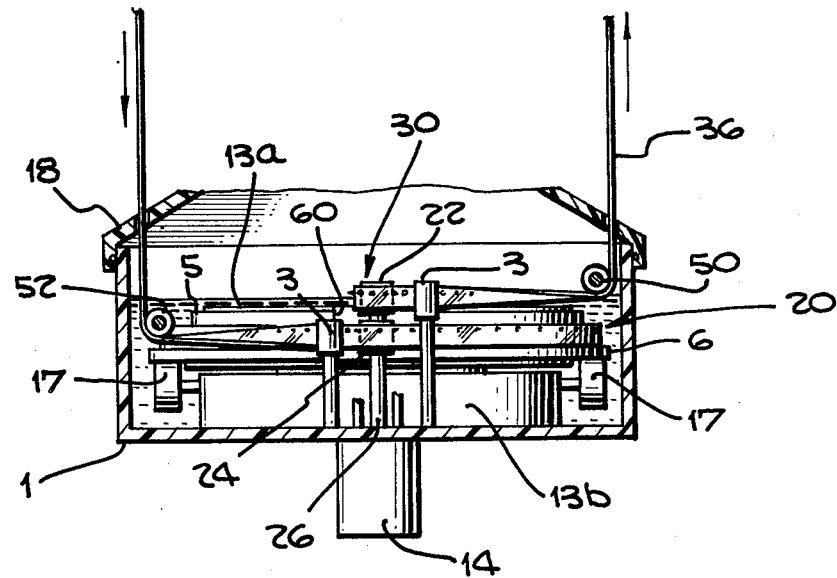
FIG. 3 is a sectional view of the present invention as viewed along line 3—3 of FIG. 2.
Figure 5:
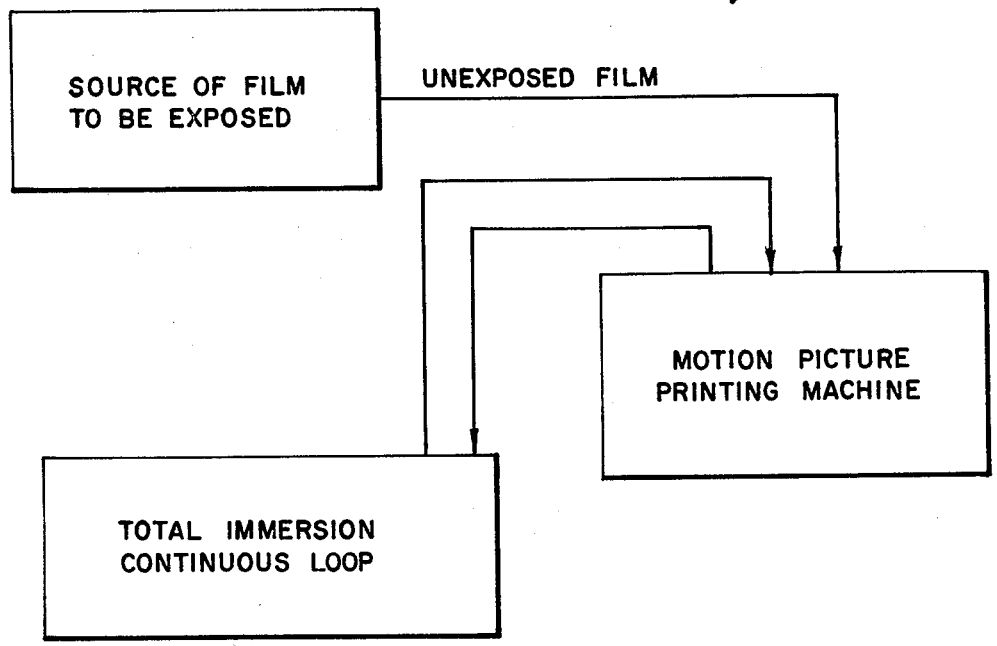
FIG. 5 is a diagrammatic view of the present invention in operation with a printing machine.

In operation, the film 36 which for example can be the master picture negative or the master sound track of a motion picture film is placed into the film storage apparatus 20 by being wound onto the film support drum 5 of the film storage apparatus 20 having said film support drum placed around the fixed center hub 13 with the film allowed to rest upon the support flange 6. Drum 5 is supported in a slightly raised position relative to flange 6. After the film 36 is fully wound around the film support drum it is spliced externally of the present invention by conventional means to form a continuous loop. In addition to the film 36, the film storage apparatus 20 contains the film support drum 5 and the driven film support flange 6. These elements allow the continuous loop of the film to circulate inside the film storage apparatus 20 and as shown in FIG. 3 provide the means for the incoming film to be wound onto the outer diameter of the film already wound on the support drum 5 while the outgoing piece of film exits the film storage apparatus 20 from the inner diameter of the film storage diameter of the film support drum 5 via a gap 60 in said film storage drum 5. Flange 6 rotates relative to drum 5, and the film 36 slides on the surface of drum 5.

Also included in the film storage apparatus 20 is a circular stripper roller 7 which allows the passage of film around its periphery so that it can pass to an angled guide roller 8 which also allows the passage of film around its periphery. The purpose of the stripper roller 7 and the angled guide roller 8 is to align the film so that it exits the film storage apparatus 20 in the proper manner. From the angled guide roller 8 the film passes through a pair of wiper blades 9. Since the entire film storage apparatus 20 is immersed in liquid, the wiper blades assist in removing a large portion of the liquid from the film before it exits the film storage apparatus 20.

Figure 2:
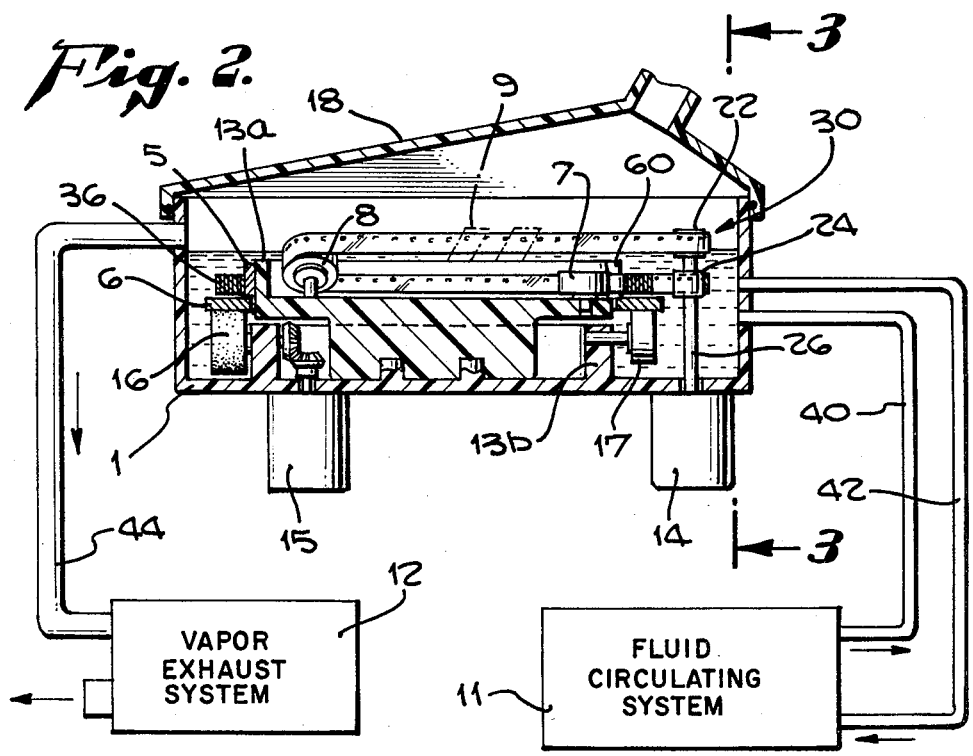
FIG. 2 is a sectional view of the present invention as viewed along line 2—2 of FIG. 1.

After the film 36 is wound onto the film storage apparatus 20 and properly spliced to form a continuous loop, the entire removable film storage apparatus 20 is placed into the tank 1. As shown in FIGS. 2 and 4, the fixed center hub 13 rests on the base of the tank 1. It is removably attached to the tank but is heavy enough so that it will not rotate. The driven film support flange 6 is supported by rollers 17. The film support drum 5 is placed over the fixed center hub 13 so that it encircles said fixed center hub 13 and further aligned so that the gap 60 in said film support drum 5 is aligned with the stripper roller 7 which as previously mentioned is located with a cavity in said fixed center hub 13. The film 36 is allowed to rest on the driven film support flange 6. The film storage apparatus 20 is allowed to rest in a horizontal fashion so that the longitudinal axis (plane of the film), is horizontally aligned. The stripper roller 7 and the angled guide roller 8 can be conventional rollers preferably without sprocket teeth that fit into the film sprocket holes and which assure that the film 36 will leave the film storage apparatus 20 with the plane of the film aligned in the proper position for exiting via upper sprocket 22 and film exit roller 50. After the removable film storage apparatus 20 is placed into the tank 1, the film 36 is guided through the film sprocket assembly 30. Film which will be exiting from the film storage apparatus 20 and the tank 1 is threaded to pass around the periphery of the upper sprocket 22. Film which will be entering the tank 1 and entering the film storage apparatus 20 is threaded to pass around the periphery of the lower sprocket 24. Guide rollers 3 and hold down rollers 28 assure that the guided film will pass around the periphery of sprockets 22 and 24 respectively. The film exiting the tank is guided to pass around the periphery of exit roller 50 which enables the plane of the film to be turned from a horizontal alignment to a vertical alignment. The film entering the tank 1 is guided to pass around the periphery of entrance roller 52 which enables the plane of the film 36 to be turned from a vertical alignment to a horizontal alignment before going to the lower sprocket 24 and then to the film storage apparatus 20.

The film is then threaded in the proper position through a film printing machine, such as that shown in Carter et al U.S. Pat. No. 4,105,329 so that the film can pass in a continuous loop exiting the removable film storage apparatus 20, passing around upper sprocket 22, passing around exit roller 50, exiting the tank 1, going through the film printing machine, reentering the tank 1, passing around film entrance roller 52, passing around lower sprocket 24, entering the removable film storage apparatus 20, being wound around the outer diameter of the film already around the film supply drum 5 by the driven film support flange 6 until it is time for the film to exit again at which point it passes through the gap in the film support drum, around the periphery of stripper roller 7, around the periphery of angled guide roller 8 which is tilted at an angle and serves to elevate the exiting film so that it will clear the film which is wound around film support drum 5, through the wiper blades 9, around the periphery of upper sprocket 22, and so forth, back to the printing machine, all in one continuous loop.

The entire sprocket assembly 30 consisting of upper sprocket 22, lower sprocket 24 and central support spindle 26 which supports upper and lower sprockets 22 and 24 respectively, is driven by sprocket driving means 14 such as an electric motor. The sprocket driving means 14 is located outside the tank 1. The sprocket driving means 14 is attached directly to the spindle 26 which rotates in a counterclockwise direction when viewed from above the spindle. Since both upper sprocket 22 and lower sprocket 24 are driven by the same driving means 14 through the same central spindle 26, the length of film exiting the tank 1 will be moving at the same speed as the length of film entering the tank 1.

The film is driven through the removable film storage apparatus 20 by the driven film support 6 flange on which the film rests. The driven film support flange 6 is driven by flange driving means 15 such as an electric motor. The flange driving means 15 is located outside the tank 1 and is connected to the driven film support flange 6 by means of a capstan type driving puck 16. The driven film support flange 6 and film 36 are driven at a speed necessary to maintain dynamic equilibrium with the rate of film being transported to and from the film storage apparatus 20 whose speed is regulated by the sprocket driving means 14, so as to minimize physical stresses such as tension, etc. that would otherwise be placed upon the film. The fixed center hub 13 and film support drum 5 are of sufficient diameter so as to minimize differential motion both longitudinally and transversely, thereby further reducing any possible effects of abrasion and resultant possible damage to the film 36. To achieve this result, the diameter of the hub 13 should preferably be at least 30 inches. In operation, the flange driving means 15 and the sprocket driving means 14 will be driving the film in a counterclockwise motion when viewed vertically downward.

In order to minimize possible damage to the film through abrasion or other particulate elements, the entire tank 1 is filled with a transparent liquid 10 such as perchlorethylene. The liquid 10 surrounds the entire film storage apparatus 20 and also enters the film storage apparatus 20 so that the film is immersed in liquid 10 while in the film storage apparatus 20. To reduce contaminations and eliminate particulate matter, the liquid is continuously filtered and circulated through the tank by a fluid circulating means 11 which is located outside of the tank 1 and connected to the tank 1 through piping means 40 and 42. Since the liquid may be volatile in nature, all vapors generated by the liquid are kept sealed inside the tank 1 by means of a vapor control cover 18. The vapors are removed from the tank 1 by means of a vapor exhaust system 12 which is located outside the tank 1 and connected to it by piping means shown as 44.

By way of example only, the flange driving means 15 and the sprocket driving means 14 may each be electric motors. The sprockets 22 and 24 may be metal of appropriately inert plastic sprockets and the central spindle 26 may be a cylindrical metal or structural plastic component such as a solid metal shaft. The film support drum 5 may be a cylindrical tube made of appropriately inert plastic or metal. The film support drum 5 has a gap of approximately a 10 degree arc in it. The driven film support flange 6 is ring-shaped with a cavity in the center and may be made of metal or appropriately inert plastic. The film support drum 5 and the driven film support flange 6 have sufficient clearance so that the driven film support flange 6 can rotate beneath the film support drum 5. The stripper roller 7 and the angled guide roller 8 may be metal or appropriately inert plastic rollers with or without teeth for guiding the film 36. The wiper blades 9 may be ordinary squeegee wiper blades which are resistant to degradation by the liquid 10. The guide rollers 3 and the hold down rollers 28 may be ordinary metal or appropriately insert plastic rollers. The tank 1 may be made of metal or appropriately inert plastic.

The present invention is designed to be used in conjunction with a dry printer or with a wet film printing machine such as the machine shown in Carter et al U.S. Pat. No. 4,105,329.

ALTERNATE FORMS

The invention has been described in considerable detail in order to comply with the patent laws by providing a full public disclosure of at least one of its forms. However, there are alternate forms of embodiment which may be used without departing from the spirit or scope of the invention.

In lieu of the film support drum 5, a series of separate individual rollers or a series of curved sections or even fluid bearings may be utilized in order to permit deviation of the general configuration from a circular form. The film support drum 5 may also have a vertical taper and/or relief to change the dynamics of stress within the film 36. The invention presently illustrated incorporates a driving sprocket for use with perforated motion picture film, but will function in the same fashion for non-perforated materials or even perforated materials if a driving capstan is employed. Additionally, common sprockets for entering and exiting film may be employed. The stripper roller 7 and angled guide roller 8 may be a configuration of rollers or curved non-rotating components providing the same guiding functions. The wiper blades 9 may assume a wide variety of configurations and even be removed from within the body of the container itself. The sprocket drive means 14 may be a mechanical coupling device integrated into the drive system of the printing machine itself. The same technique may be used to replace or eliminate the flange drive means 15. Furthermore, the flange drive puck 16 may be a geared or positive drive device on the vertical surface or both the vertical and horizontal surfaces of the film support flange 6. Though economically impractical and operationally undesirable, the wiper blades 9, fluid circulating system 11, and vapor exhaust system 12, may be eliminated or exist external of the present invention in its preferred form. The vapor control 11 may be eliminated in the event a non-volatile liquid is utilized or external means of vapor removal provided, and it may have several sections instead of one section 18 as shown. In order to minimize the problems created by gravity, the present invention is horizontal in attitude as indicated in FIG. 1. However, the same principles and techniques will be applied if it is vertical or inclined at an angle. Incorporating more than one Total Immersion Continuous Loop Apparatus in a common fluid circulating system or vapor exhaust system, is a desired and useful embodiment of the invention. There can be two separate tanks, one containing the master film negative and one containing the sound track, either side by side or one on top of the other, both served by a single fluid circulating system and by a single vapor exhaust system. The fixed or removable status of any of the components for purpose of loading or unloading is within the scope of the intended utilization, inasmuch as the container itself may be used as a storage compartment for the film for periods of time, and immediate availability for printing from same would be desirable.

The fixed center hub 13 may be removably attached to the tank 1 or may be permanently affixed to the tank. The present invention is designed to be used with either a dry motion picture printing machine, a wet motion picture printing machine, or both. Although the term film has been used in the illustrative examples of the specification, this is in no way intended to limit the present invention for use with any flexible web material other than film, such as microfilm.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the methods shown are intended only for illustration and for disclosure of an operative embodiment and not to show all of the various forms of modification in which the invention might be embodied.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. A method of supplying a master picture negative, a master sound track, or other flexible web material to a dry or wet motion picture printing machine comprising the steps of:

arranging the master picture negative, master sound track, or other flexible web material in a continuous loop arrangement having a multi-loop portion and an extended loop portion;

threading the extended loop portion of said master picture negative, master sound track, or other flexible web material into and through said dry or wet motion picture printing machine;

immersing the multi-loop portion of the master picture negative, master sound track, or other flexible web material in a tank which contains a liquid that is compatible with the master picture negative, master sound track, or other flexible web material; and then driving the master picture negative, master sound track or other flexible web material in a continuous loop path through the printing machine.

2. An apparatus for supplying a flexible web material to a motion picture printing machine comprising:

a tank;

liquid filling the entire tank;

a flexible web material arranged in a continuous loop and having a multi-loop portion and an extended loop portion;

said liquid being physically compatible with said flexible web material;

a thin-walled cylindrical member having a gap in its periphery;

a ring shaped sheet member having a cavity in its central portion, said cylindrical member being disposed above said sheet member and about said gap;

said multi-loop portion of said flexible web material being arranged so it surrounds said cylindrical member and is disposed above said ring-shaped sheet member while being immersed in said liquid;

a solid cylindrical piece of material containing a central cavity, being positioned inside said tank so that it rests on the base of said tank;

multiple support rollers surrounding said solid cylindrical piece of material inside said tank;

said multi-loop portion of said flexible web material being placed inside said tank so that said cylindrical member surrounds said cylindrical piece of material and said ring-shaped sheet member rests on said support rollers;

driving means to cause said ring-shaped sheet member and said flexible web material to rotate in a circular fashion;

two separate sprockets located inside said cavity of said cylindrical piece of material with one vertical sprocket vertically so aligned as to fit adjacent the gap in said cylindrical member and the other sprocket aligned in an angle;

a spindle containing two sprockets along its shaft and vertically aligned next to and on the outside surface of said multiple portion of said flexible web material;

said extended portion of said flexible web material being threaded through a motion picture printing machine;

said extended portion of said flexible web material being arranged so that one end passes around said sprocket located inside said cavity of said cylindrical piece of material and passes around one of said sprockets on said spindle located adjacent said multi-loop portion of said flexible web material and then exits said tank and enters said motion picture printing machine;

said extended portion of said flexible web material further arranged so that said extended portion of said flexible web material returning from said motion picture printing machine enters said tank, passes around the second sprocket on said spindle located adjacent said multi-loop portion of said flexible web material, and then travels to and becomes part of the outer circumference of said multi-loop portion of said flexible web material; and means for continuously circulating and filtering said liquid while said apparatus is in operation.

3. An apparatus as defined in claim 2 wherein said flexible web material is a master picture negative.

4. An apparatus as defined in claim 2 wherein said flexible web material is a master sound track.

5. An apparatus as defined in claim 2 wherein said liquid is Perchlorethylene.

6. An apparatus as defined in claim 2 wherein said tank is sealed to trap vapors which are generated in said liquid, and includes means for exhausting said vapors from said tank.

* * * * *